Patented Aug. 16, 1927.

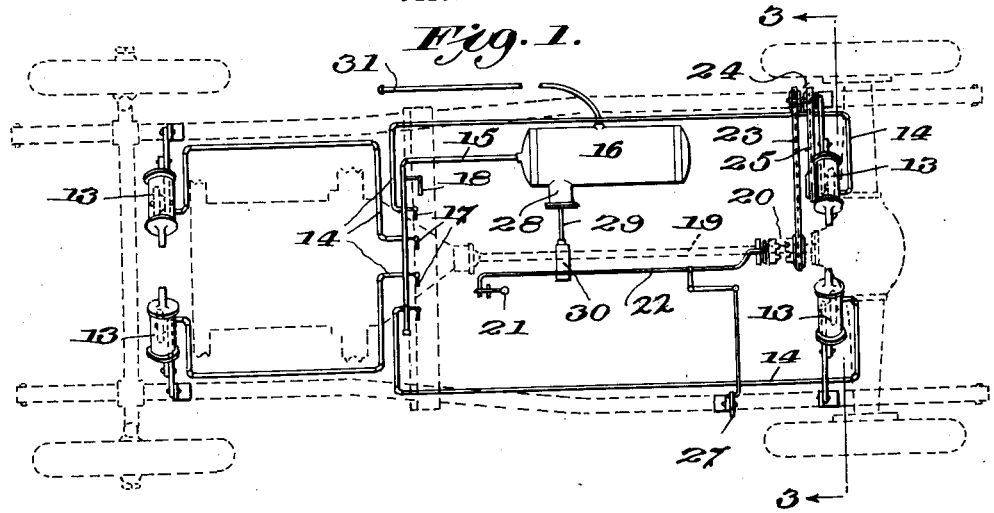

1,639,054

UNITED STATES PATENT OFFICE.

FLOYD PALMER, OF JACKSONVILLE, FLORIDA.

AUTOMOBILE PARKING MEANS.

Application filed December 21, 1926. Serial No. 156,203.

As is well known the parking of automobiles, especially on the streets of large cities, has become a serious problem. Time and skill are required for getting into and out of a parking space when cars are parked parallel with the curb, when each car is supposed to take space barely more than its length. The primary object of my invention is to provide means by which a car may be readily and quickly moved into and out of a position parallel with the curb without requiring any lengthwise movement of the car, and thus reducing to the minimum the space required for the length of each car, and in effect increase the amount of space available for parking. In providing mechanism for achieving the primary object of my invention, it will be found as hereinafter set forth that other benefits or advantages are achieved by my invention.

My invention consists in whatever is described by or is included within the terms or scope of the appended claims.

In the annexed drawings:

Fig. 1 is a bottom plan view somewhat diagrammatic of an automobile equipped with parking mechanism embodying my invention;

Fig. 2 is a longitudinal section;

Fig. 3 is a cross section on the line 3—3 of Fig. 1.

Giving a brief general description of the embodiment of my invention shown in the drawings, I mount on the chassis adjacent or upon the front and rear axles and adjacent each of the four wheels a swinging arm which carries a small wheel or roller which by the movements of the arm may be swung into contact with the pavement or ground and out of contact therewith, and when in contact raising the adjacent car wheels above the surface and themselves constituting rolling supports for the car with their axes extending longitudinally of the car so that thereon the car may be bodily rolled sidewise into and out of parking position, and preferably I provide a driving connection with the car motor or engine for revolving said rollers or one of them especially in the case of large or heavy cars, although it is within the purview of my invention not to provide any motor driven means for revolving the rollers. Power to swing the rollers is preferably compressed air, a pneumatic cylinder or tank being provided, air therein being compressed to the desired pressure from the car motor or engine, and I use compressed air for the purpose because compressed air can also be used for other purposes in connection with the car, such for example, as operating an engine starter and pumping or inflating tires. A special starting engine operated by compressed air could be installed, for example, between the car engine and the cooling fan, two such compressed air motors being preferably employed connected with the car engine crank shaft to avoid a dead center.

Describing in detail what is shown in the drawings I pivot on or to the chassis just inside each wheel thereon an arm, 10, which at its free end carries a small wheel or roller, 11, which by the swinging of the arm is moved into or out of contact with the street or road surface, and pivotally connected to each arm is the piston rod, 12, of a piston in a pneumatic cylinder, 13, to which a branch air pipe, 14, runs from a main air pipe, 15, which is in communication with a compressed cylinder or tank, 16, suitably supported on the underside of the chassis, said pipe, 15, being extended preferably to the instrument board of the car at which point each of the branch pipes connects therewith, and at such point each branch pipe having a valve, 17, for control of the flow of air through the pipe. A valve, 18, is provided in the main pipe between the branches and the compressed air or cylinder so that simultaneously by the action of that one valve, air may be supplied to all of the cylinders, 13, to effect the movement of all of the roller carrying arms at one time. Each branch pipe is provided with a valve so that any one roller alone may be swung into ground engaging position which may be desirable for the purpose of lifting the adjacent car wheel to replace a tire. Loose on the engine or transmission shaft, 19, is a pulley which by a friction clutch, 20, may be clutched to and unclutched from the shaft by means of a lever, 21, located in front of the seat which by a rod, 22, is connected with the clutch. From said pulley a cord or chain, 23, runs to a double pulley, 24, journalled on the pivot of one of the roller carrying arms and from said pulley a cord or chain, 25, runs to a pulley, 26, fixed to the shaft on which the roller is fixed, and thus power may be taken from the engine to rotate said roller and thereby cause the movement of the car sidewise. In the case of those rollers which are not driven by power, the arm which carries them is made of two transversely separated parts that are pivoted together on an axis at right angles to the roller axis so that the roller may be turned from a position with its axis extending longitudinally of the car to a position crosswise of the car and parallel with the car axle, to enable the use of the roller to transport the car under conditions making use of the car wheel for that purpose undesirable as when its tire is deflated, the roller thus being capable of use as an emergency device. Of course, suitable lock means will be employed to hold the roller in either of its two positions.

To bring the car out of the parking space the engine is started and put in reverse and preferably a signal consisting of an arm, 27, pivoted to swing from a position in the car to one projected at one side thereof is provided so as to give warning to approaching traffic that the car is about to be moved out, said arm being automatically operated. By a suitable lock the mechanism when in the position to raise the car may be locked and thus an obstacle presented to theft of the car.

A pump, 28, is applied to the compressed air tank for compressing the air therein, the pump being connected by a rod, 29, with an eccentric, 30, on the transmission shaft, so that all the time the engine is running compressed air is being stored in the tank. Of course, a suitable safety valve will be applied to the tank to relieve the pressure therein, should it become excessive from the operation of the engine.

A flexible tube or hose, 31, is connected with the compressed air tank, said hose being long enough to reach to each of the tire valves for inflating the tire. Should it be found necessary or desirable a suitable clutch may be provided to disconnect the drive from the excentric, 30.

Compressed air may be taken from the tank to operate four wheel brakes.

Compressed air may be used both to swing the roller carrying arms into ground engaging position and to retract them, or as shown in the drawings, a spring, 31, may be applied to lift the roller carrying arms from ground engaging position.

My invention may be applied to an automobile as original construction, or as will be evident, the necessary parts may be constructed and assembled as a unit for application to a car as an attachment which could be applied by any garage man.

What I claim is:

1. As a means for supporting a motor vehicle for sidewise movement independently of its usual wheels, a plurality of movable ground engaging devices and means for moving all of said devices simultaneously or anyone of them alone.

2. As a means for supporting a motor vehicle for sidewise movement independently of its usual wheels, a plurality of movable ground engaging devices and means for moving all of said devices simultaneously or anyone of them alone, comprising a main air supply pipe having a valve and branch pipes for each of said devices, each branch pipe having its own valve beyond the main pipe valve.

3. In combination with an automobile, a plurality of rollers movable into and out of engagement with the ground pivoted arms carrying said rollers by the swinging of which they are moved into and out of ground-engagement and means to revolve at least one of such rollers when in contact with the ground comprising gearing that includes a wheel journalled concentric with the pivot of the arm which carries the roller to be revolved.

4. In combination with an automobile, a plurality of rollers movable into and out of engagement with the ground pivoted arms carrying said rollers by the swinging of which they are moved into and out of ground-engagement and means to revolve at least one of such rollers when in contact with the ground comprising gearing that includes a wheel journalled concentric with the pivot of the arm which carries the roller to be revolved, comprising a controllable operative connection with the automobile engine.

In testimony whereof I hereunto affix my signature.

FLOYD PALMER.